(12) United States Patent
Osako et al.

(10) Patent No.: US 6,742,986 B2
(45) Date of Patent: Jun. 1, 2004

(54) VARIABLE DISPLACEMENT TURBINE

(75) Inventors: Katsuyuki Osako, Nagasaki (JP); Yasuaki Jinnai, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/168,046

(22) PCT Filed: Oct. 16, 2001

(86) PCT No.: PCT/JP01/09066

§ 371 (c)(1),
(2), (4) Date: Sep. 13, 2002

(87) PCT Pub. No.: WO02/35063

PCT Pub. Date: May 2, 2002

(65) Prior Publication Data

US 2003/0039543 A1 Feb. 27, 2003

(30) Foreign Application Priority Data

Oct. 20, 2000 (JP) .................................. 2000-321464

(51) Int. Cl.[7] ............................................. F01D 17/16
(52) U.S. Cl. ..................... 415/163; 415/164; 415/165
(58) Field of Search ................................. 415/160, 205, 415/206, 163, 164, 165

(56) References Cited

U.S. PATENT DOCUMENTS 4,804,316 A * 2/1989 Fleury ........................ 417/407
6,558,117 B1 * 5/2003 Fukaya et al. .............. 415/164

FOREIGN PATENT DOCUMENTS

| JP | 3-10039 | 1/1991 |
| JP | 7-25249 | 5/1995 |
| JP | 11-190219 | 7/1999 |
| JP | 11-336554 | 12/1999 |
| JP | 2000-204907 | 7/2000 |

* cited by examiner

*Primary Examiner*—Ninh H. Nguyen
(74) *Attorney, Agent, or Firm*—Wenderoth, Lind & Ponack, L.L.P.

(57) ABSTRACT

A support pin (24) is disposed at a position in front of a front edge (19a) of a movable nozzle blade (19) in a state in which the movable nozzle blade (19) is located at a rating opening position B, set between a maximum opening position A and a minimum opening position C. The aerodynamic effect of the support pin when the flow rate is small is thus reduced, and the turbine efficiency when the flow rate is small is enhanced.

8 Claims, 18 Drawing Sheets

(a)

(b)

(c)

(a)

(b)

(c)

(a)

(b)

(c)

(a)

(b)

(c)

(a)

(b)

(c)

(a)

(b)

(c)

VARIABLE DISPLACEMENT TURBINE

TECHNICAL FIELD

The present invention relates to a radial turbine used for a turbocharger or the like for a vehicle such as an automobile. More particularly, this invention relates to a variable displacement turbine having movable nozzle blades (variable nozzle).

BACKGROUND ART

In a variable displacement turbine used for a turbocharger or the like, a plurality of movable nozzle blades are rotatably provided between two opposed side wall surfaces around an outer periphery of a turbine blade wheel through shaft bodies, respectively. The nozzle discharge angle and the passage area of an entrance of each of the movable nozzle blades ("movable blade entrance") vary by rotation of the movable nozzle blades, and thereby the turbine capacity also varies.

The variable displacement turbine is provided with a support pin which sets the clearance extending across between the two side wall surfaces so that a distance between the two side wall surfaces between which the movable nozzle blade is disposed, i.e. a nozzle clearance, is maintained at an appropriate value even if the side surfaces are exposed to high temperature gas such as exhaust gas.

The support pin is indispensable for the structure, but since the support pin exists in the working medium flow path in the turbine entrance, the support pin becomes a resistance in the flow path. This may cause lowering of the turbine efficiency an aerodynamic influence. Especially, the aerodynamic influence of the support pin, when the quantity of flow is small, is great, and a reduction in turbine efficiency when the quantity of flow is small is a problem.

Various attempts have been made to lower the reduction of the turbine efficiency caused by the support pin, as shown in Japanese Utility Model Application Laid-open No. H7-25249, Japanese Patent Application Laid-open No. H11-190219 and Japanese Patent Application Laid-open No. H11-336554. According to the techniques described in these publications, the mechanical structure of the support pin is improved, the resistance of the flowpath caused by the support pin is reduced, and the reduction of the turbine efficiency is lowered.

The conventional technique which improves the mechanical structure of the support pin achieves the tentative object, but there is a tendency of the structure of the support pin to become complicated, and there is a limit in reducing the resistance of the flow path by just improving the mechanical structure of the support pin. In order to obtain better turbine efficiency, it is necessary to further reduce the resistance of the flow path caused by the support pin.

It is an object of the present invention to provide a variable displacement turbine capable of effectively reducing the flow path resistance caused by a support pin, capable of reducing the aerodynamic influence of the support pin when the quantity of flow is small, and capable of improving the turbine efficiency when the quantity of flow is small.

DISCLOSURE OF THE INVENTION

The present invention provides a variable displacement turbine in which a plurality of movable nozzle blades are rotatably provided between two opposed side wall surfaces around an outer periphery of a turbine blade wheel by respective shaft bodies. A clearance setting support pin extending across between the two side wall surfaces is provided in order to maintain a distance between the two side wall surfaces at an appropriate value. The support pin is disposed at a position in front of a front edge of the movable nozzle blade in a state in which the movable nozzle blade is located at a rating opening position ($\alpha=20°\pm5°$) which is set between a maximum opening position and a minimum opening position.

With this structure, an aerodynamic effect, an especially aerodynamic effect in a state of the rating opening position being at the minimum opening position, is reduced by the disposition position of the support pin with respect to the movable nozzle blade, and efficiency on the region at a small flow rate is enhanced.

To obtain further effects in the variable displacement turbine of the invention, the support pin is disposed on an extension line or in the vicinity of the extension line of a logarithmic spiral which passes a blade thickness central portion of the movable nozzle blade located in the rating opening position ($\alpha=20°\pm5°$).

To obtain further effects in the variable displacement turbine of the invention, when an outer diameter of the support pin is defined as d, the support pin is disposed in a distance range away from the front edge of the movable nozzle blade through $3d$.

To obtain further effects in the variable displacement turbine of the invention, the disposition position of the support pin is further defined such that the support pin is located on the side of a negative pressure surface of the movable nozzle blade by increasing the opening of the movable nozzle blade from the rating opening position ($\alpha=20°\pm5°$), and the support pin is located on the side of a pressure surface of the movable nozzle blade by reducing the opening of the movable nozzle blade from the rating opening position ($\alpha=20°\pm5°$).

The invention also provides a variable displacement turbine in which a plurality of movable nozzle blades are rotatably provided between two opposed side wall surfaces around an outer periphery of a turbine blade wheel by respective shaft bodies. A clearance setting support pin extending across between the two side wall surfaces is provided in order to maintain a distance between the two side wall surfaces at an appropriate value. The support pin is disposed at a position closer to a front edge of the movable nozzle blade than a rotation center position of the movable nozzle blade on the side of a pressure surface of the movable nozzle blade without contacting with the movable nozzle blade located at a maximum opening position.

With this structure also, the aerodynamic effect, especially the aerodynamic effect in a state of a low opening position, is reduced by the disposition position of the support pin with respect to the movable nozzle blade, and the efficiency in the region of a small flow rate is enhanced.

To obtain further effects, the disposition position of the support pin is further defined such that the support pin is between a front edge position of the movable nozzle blade and a substantially intermediate position between a rotation center of the movable nozzle blade and the front edge of the movable nozzle blade.

BEST MODE FOR CARRYING OUT THE INVENTION

Embodiments of the variable displacement turbine of the present invention will be explained in detail below with reference to the accompanying drawings.

Figure 1:
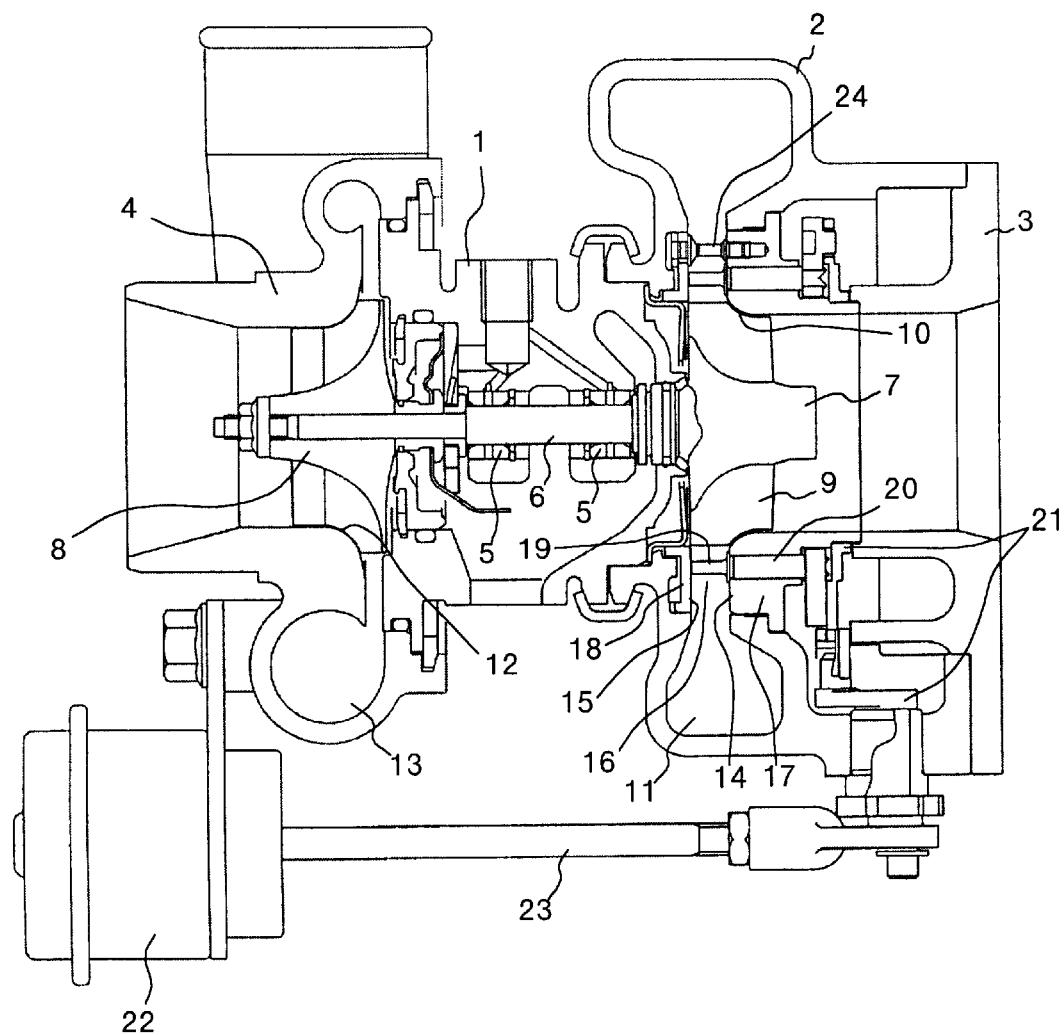
FIG. 1 is a sectional view which shows an entire structure when a variable displacement turbine of the present invention is applied to a turbocharger for an automobile.

FIG. 1 is a sectional view which shows the entire structure when a variable displacement turbine of the present invention is applied to a turbocharger for an automobile.

The turbocharger comprises four housing assemblies, i.e., a central bearing housing 1, a turbine housing 2 and a turbine outlet housing 3 mounted to one side of the bearing housing 1, and a compressor housing 4 mounted to the other side of the bearing housing 1.

The bearing housing 1 rotatably supports a turbine shaft 6 by a bearing 5. The turbine shaft 6 passes and extends through the bearing housing 1 in the lateral direction as viewed in FIG. 1. The turbine shaft 6 is integrally provided at its one end with a turbine blade wheel 7, and a compressor blade wheel 8 is mounted to the other end of the turbine shaft 6.

The turbine blade wheel 7 is formed into a radial turbine shape and has a plurality of turbine blades (movable blades) 9. The turbine blade wheel 7 is disposed in a turbine chamber 10 defined by the turbine housing 2. A scroll section 11 of the turbine is formed outside the turbine chamber 10 by the turbine housing 2. The compressor blade wheel 8 is disposed in a compressor chamber 12 defined by the compressor housing 4. A scroll section 13 of the compressor is formed outside the compressor chamber 12 by the compressor housing 4.

An inlet passage 16 is defined around an outer periphery of the turbine blade wheel 7, i.e., between the turbine chamber 10 and the scroll section 11, by two opposed side walls 14 and 15. In this embodiment, one of the side walls 14 is given by a nozzle mount member 17 fixed to the turbine housing 2, and the other side wall 15 is given by a nozzle plate 18 provided in the turbine housing 2.

The inlet passage 16 is of annular shape and concentric with a rotation center of the turbine blade wheel 7. The inlet passage 16 is provided with a plurality of movable nozzle blades 19 rotatable by shaft bodies 20, respectively. Each of the shaft bodies 20 is operatively connected to an operation rod 23 of an actuator 22 by a link mechanism 21, and is rotated and driven by the actuator 22. Each of the movable nozzle blades 19 is rotated and displaced between a maximum opening position A, a rating opening position (intermediate position) B and a minimum opening position C (see FIG. 2).

In order to maintain a distance between the two opposed side walls 14 and 15, i.e., a size of the inlet passage 16 in its widthwise direction, at an appropriate value, a support pin 24, which sets a clearance extending across the inlet passage 16, is provided. The support pin 24 is of columnar shape, its one end is fixed to the nozzle mount member 17 and the other end is connected to the nozzle plate 18.

Figure 2:
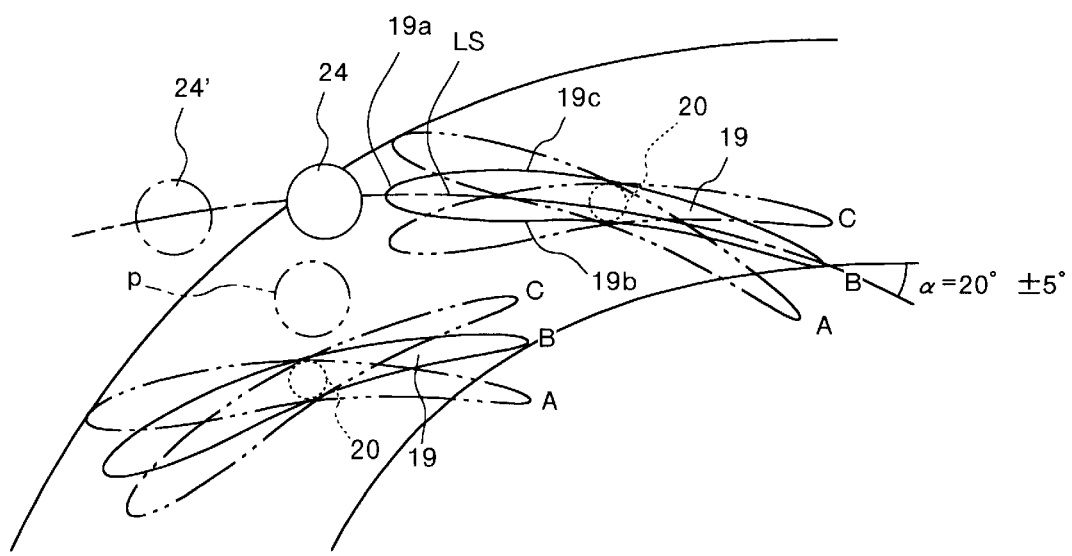
FIG. 2 is an explanatory view which shows an essential portion of an embodiment of the variable displacement turbine of the invention.

A feature of the variable displacement turbine according to this invention resides in a positional relationship of the support pin 24 with respect to the movable nozzle blade 19. The disposition position of the support pin 24 is optimized, and as shown in FIG. 2, the support pin 24 is disposed in front of a front edge 19a of the movable nozzle blade 19 in a state in which the movable nozzle blade 19 is located in the rating opening position B which is set between the maximum opening position A and the minimum opening position C. More specifically, the support pin 24 is disposed at a position on an extension line or in the vicinity of the extension line of a logarithmic spiral LS which passes a blade thickness central portion of the movable nozzle blade 19 located in the rating opening position B and a position extremely close to the front edge 19a.

The rating opening position B here is an opening corresponding to a design flow rate at which a peak efficiency can be obtained, i.e., $\alpha$ is an angle of about $20°\pm5°$.

With this disposition position, if the opening of the movable nozzle blade 19 is increased from the rating opening position B (turning in the clockwise direction in FIG. 2), the support pin 24 is located on the side of a negative pressure surface 19b of the movable nozzle blade 19, and if the opening of the movable nozzle blade 19 is reduced from the rating opening position B (turning in the counter clockwise direction in FIG. 2), the support pin 24 is located on the side of a pressure surface 19c of the movable nozzle blade 19.

Figure 3:
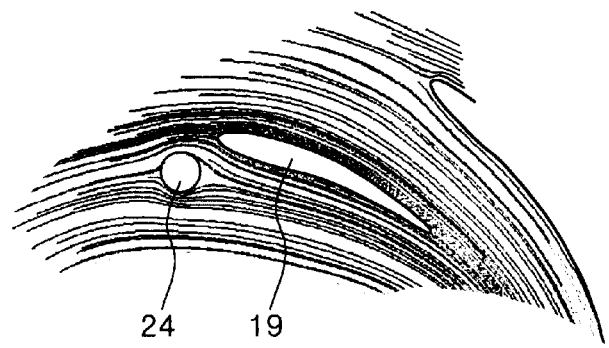
FIGS. 3(a) to (c) show flow lines around movable nozzle blades and a support pin of the invention.
Figure 3:
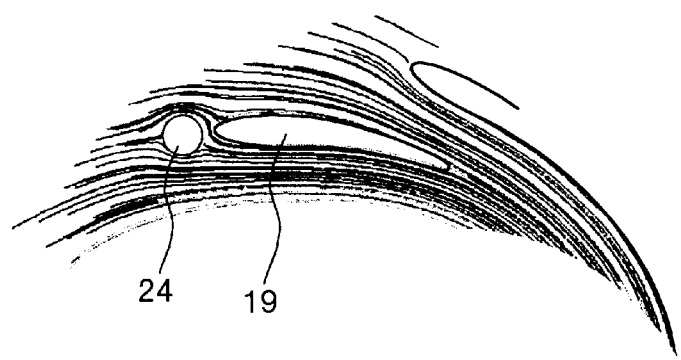
Figure 3:
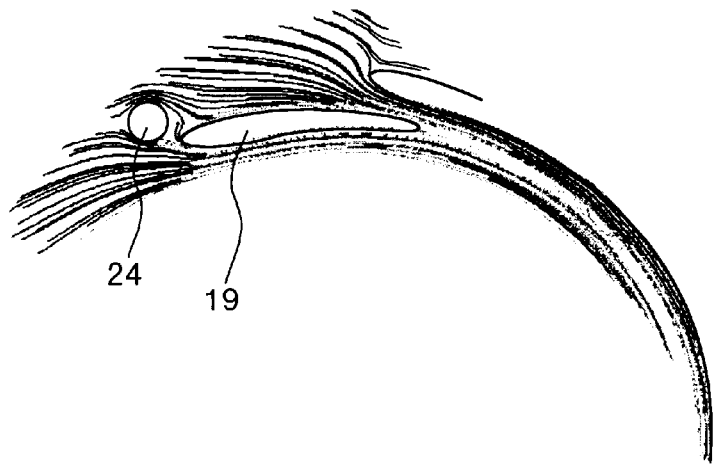
Figure 4:
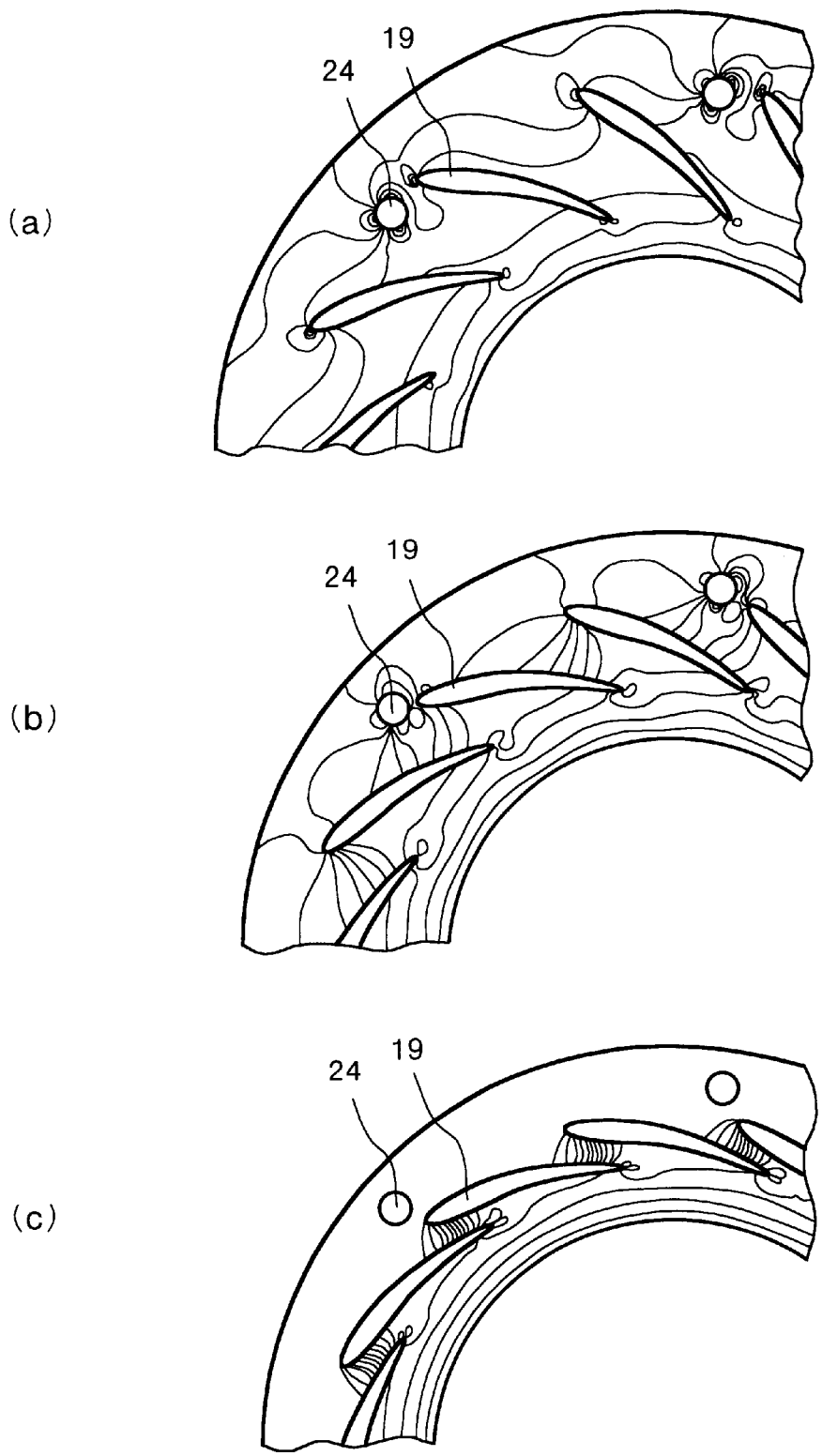
FIGS. 4(a) to (c) show a static pressure distribution around the movable nozzle blades and the support pin in the variable displacement turbine of the invention.
Figure 5:
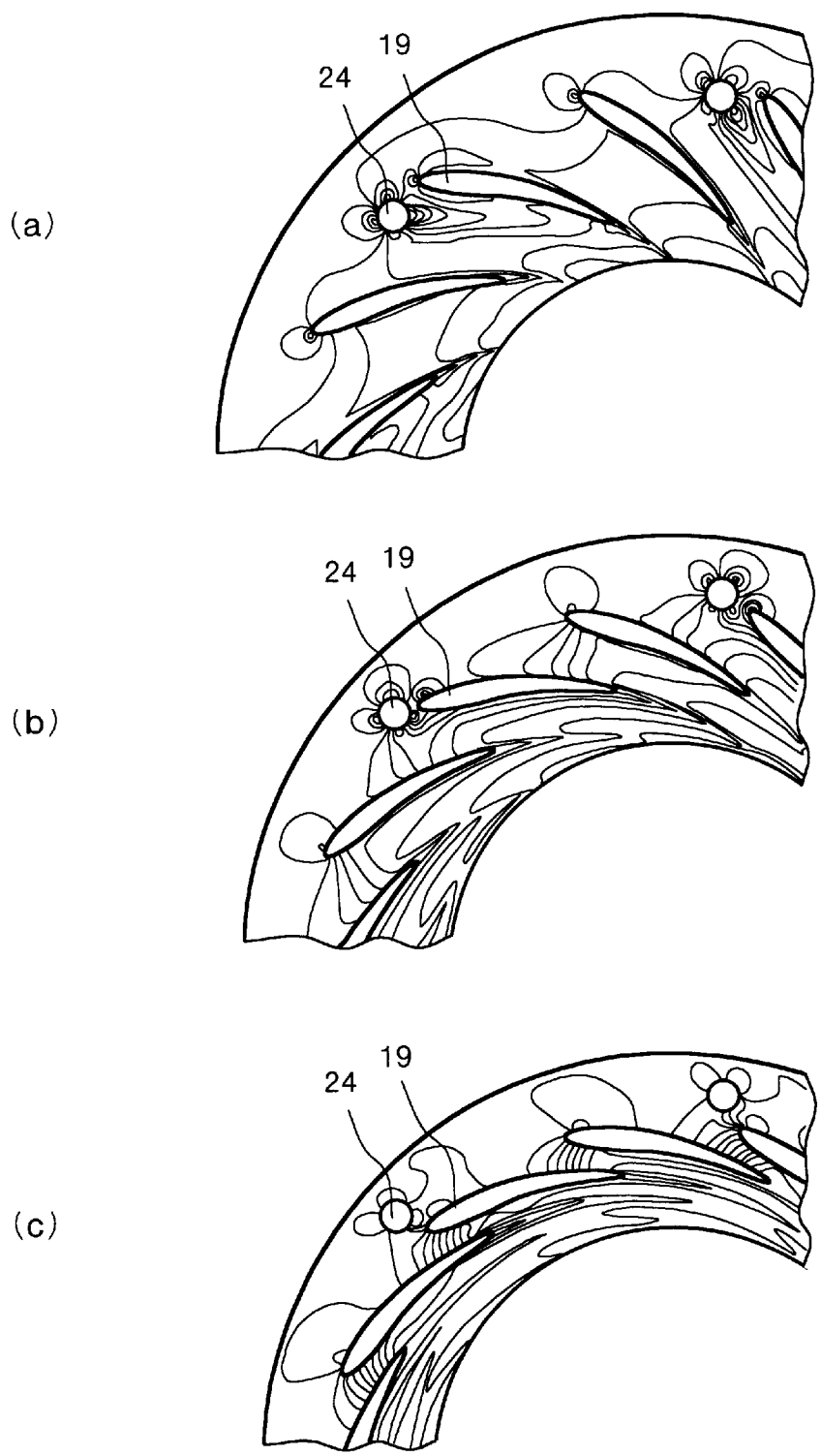
FIGS. 5(a) to (c) show the absolute velocity distribution of flow around the movable nozzle blades and the support pin in the variable displacement turbine of the invention.

FIG. 3 shows flow lines around the movable nozzle blades 19 and the support pin 24 obtained by a result of flow analysis when the support pin 24 is located on the disposition position as described above. FIG. 4 shows static pressure distribution and FIG. 5 shows absolute velocity distribution. In FIGS. 3 to 5, (a) shows a maximum opening position state, (b) shows a rating opening position state and (c) shows a minimum opening position state.

Figure 16:
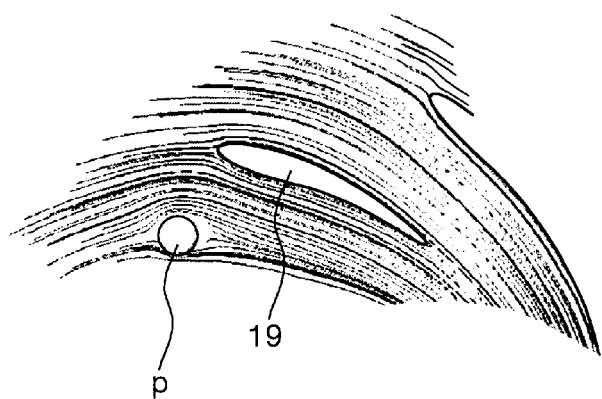
FIGS. 16(a) to (c) show flow lines around the movable nozzle blades and the support pin in a conventional variable displacement turbine.
Figure 16:
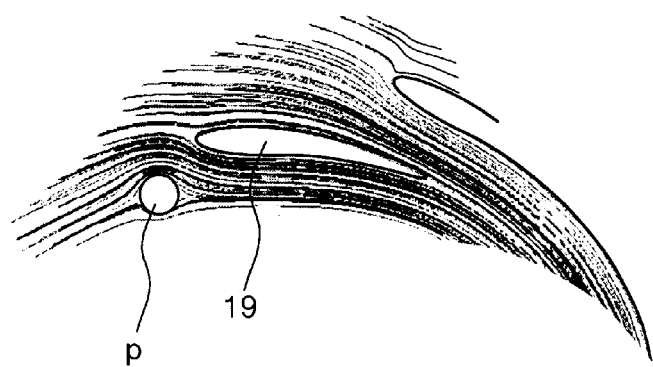
Figure 16:
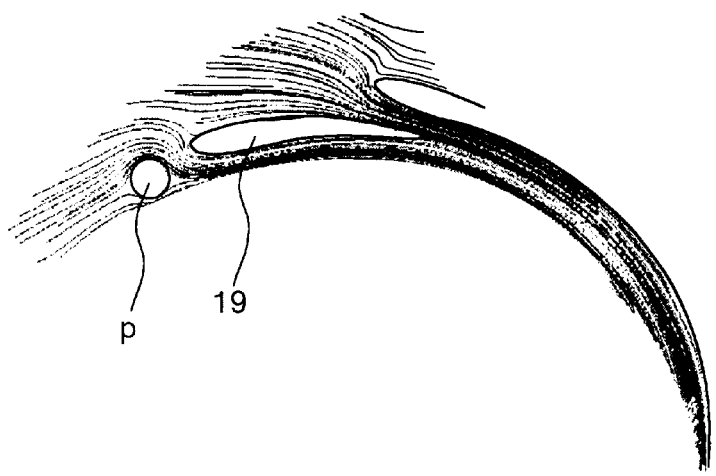
Figure 17:
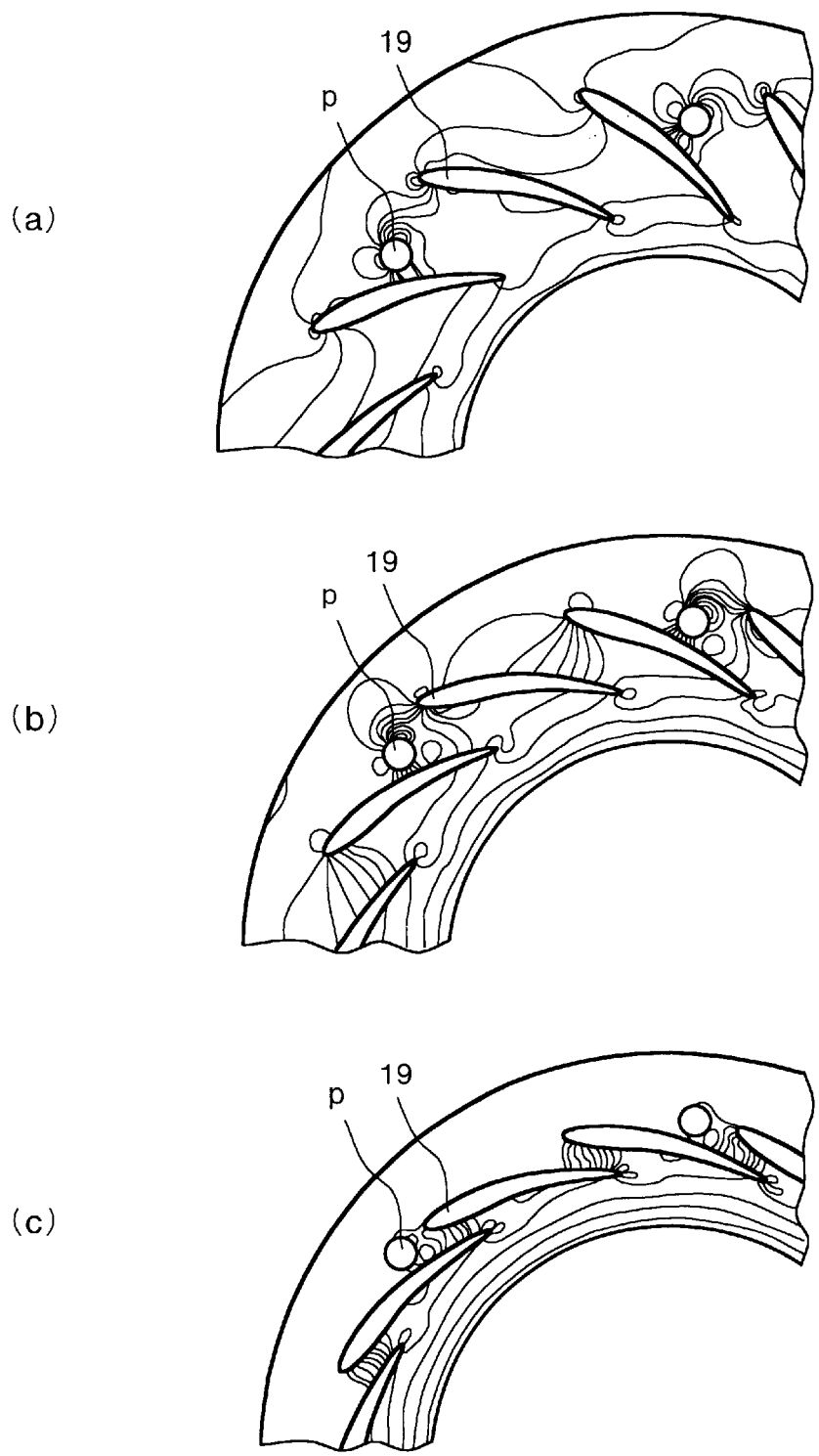
FIGS. 17(a) to (c) show a static pressure distribution around the movable nozzle blades and the support pin in the conventional variable displacement turbine.
Figure 18:
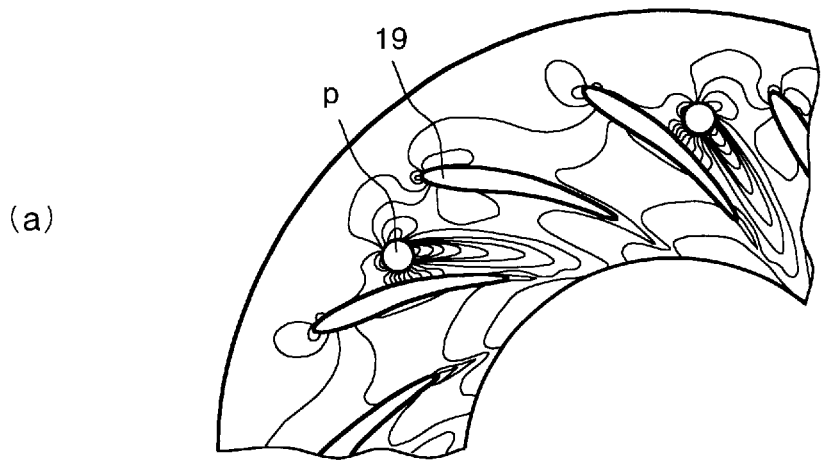
FIGS. 18(a) to (c) show the absolute velocity distribution of flow around the movable nozzle blades and the support pin in the conventional variable displacement turbine.
Figure 18:
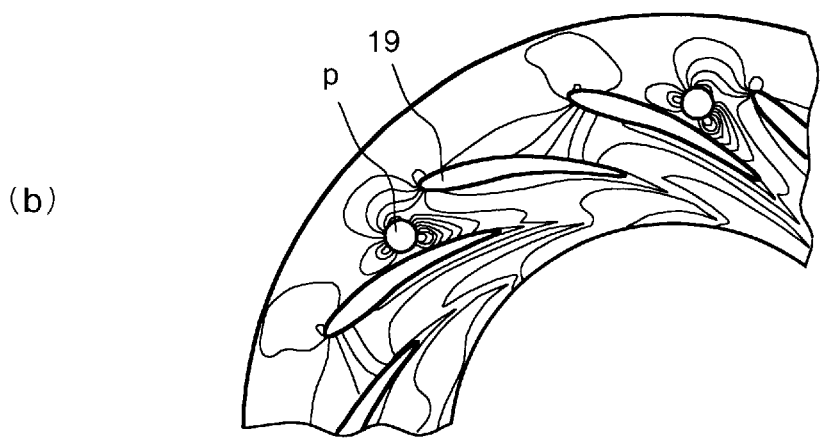
Figure 18:
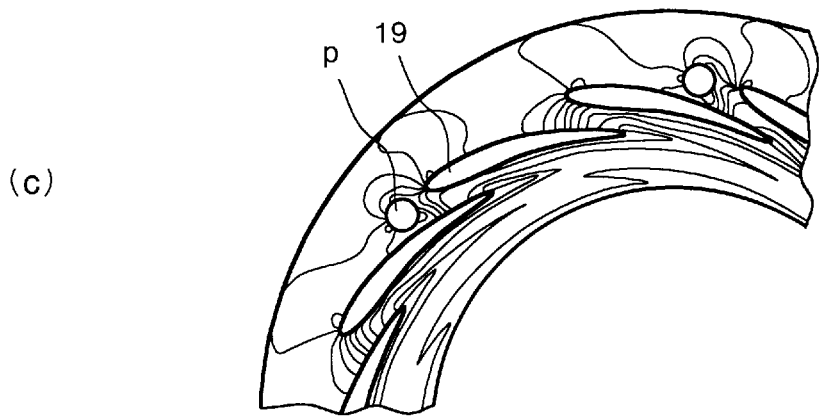

In FIG. 2, a symbol p represents a standard disposition position of a conventional support pin. FIG. 16 shows flow lines around the movable nozzle blade 19 and the support pin p obtained by a result of the flow analysis in the instance of the support pin p. FIG. 17 shows static pressure distribution and FIG. 18 shows the absolute velocity distribution. In FIGS. 16 to 18 also, (a) shows a maximum opening position state, (b) shows a rating opening position state and (c) shows a minimum opening position state.

From the above flow analysis result, in the conventional example, the support pin p aerodynamically affects the movable nozzle blade 19 at any nozzle opening, and especially in the minimum opening position, the support pin p closes a passage between the nozzle blades which becomes great flow path resistance. Whereas, with the support pin 24, there is almost no aerodynamic effect in the minimum opening position to the rating opening position, and in the maximum opening position, although there is a slight effect, great pressure expansion is not generated in the vicinity of the nozzle blade, and since the nozzle throat area is great, it is conceived that there is no problem. With this, the support pin 24 does not affect the movable nozzle blade 19 aerodynamically especially when the movable nozzle blade 19 is in the minimum opening position to the rating opening position, and the efficiency on the side of small flow rate is enhanced.

Hydrodynamically, due to flow around the column (support pin), vortex streets generated downstream from the column (vortex street of Karman) affect each other at induction speed, which results in the requirement of about three times the length of the outer diameter of the column for the vortex streets to exist stably.

With this, in order not to generate the Karman vortex, it is preferable that the support pin 24 is disposed within a distance range separated away from the front edge 19a of the movable nozzle blade 19 through a distance 3d if the outer diameter of the support pin 24 is defined as d. A symbol 24' in FIG. 2 represents a limit example where the support pin is disposed at a position away from the front edge 19a of the movable nozzle blade 19 through 3d.

Figure 6:
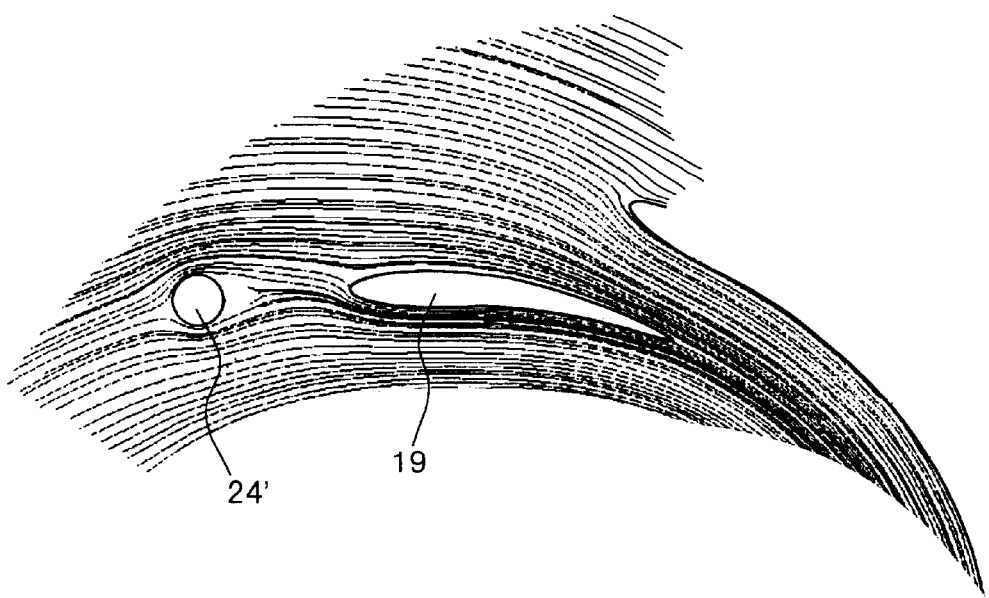
FIG. 6 shows flow lines around the movable nozzle blades and the support pin in the variable displacement turbine of the invention.
Figure 7:
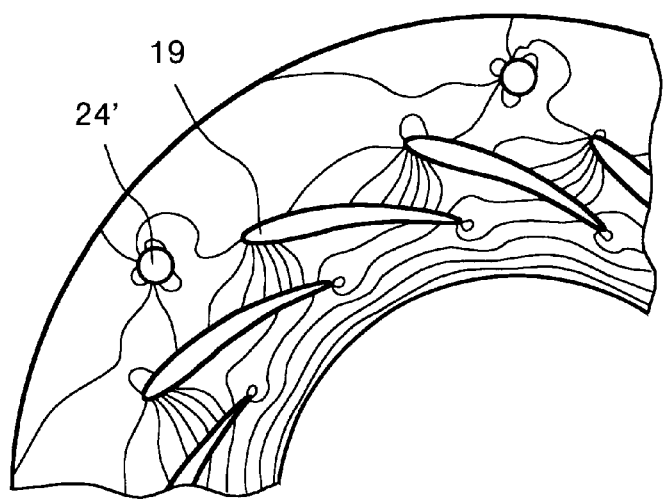
FIG. 7 shows a static pressure distribution around the movable nozzle blades and the support pin in the variable displacement turbine of the invention.
Figure 8:
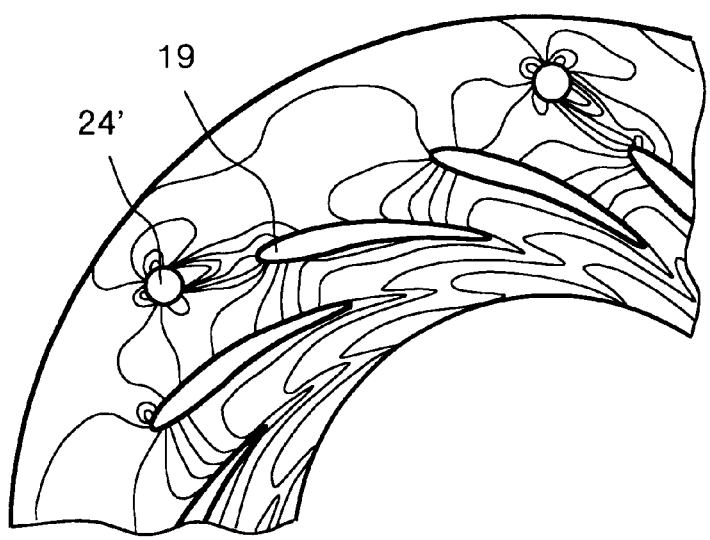
FIG. 8 shows an absolute velocity distribution of flow around the movable nozzle blades and the support pin in the variable displacement turbine of the invention.

FIG. 6 shows flow lines around the movable nozzle blades 19 and the support pin 24' obtained by a result of the flow analysis when the support pin 24' is disposed in the disposition position described above, FIG. 7 shows a static pressure distribution and FIG. 8 shows the absolute velocity distribution. In FIGS. 6 to 8, the rating opening position state is shown as representative.

Also with the support pin 24', there is almost no aerodynamic effect in the minimum opening position to the rating opening position. When the movable nozzle blade 19 is in the minimum opening position to the rating opening position, there is almost no aerodynamic effect, and efficiency on the side of small flow rate is enhanced.

Figure 9:
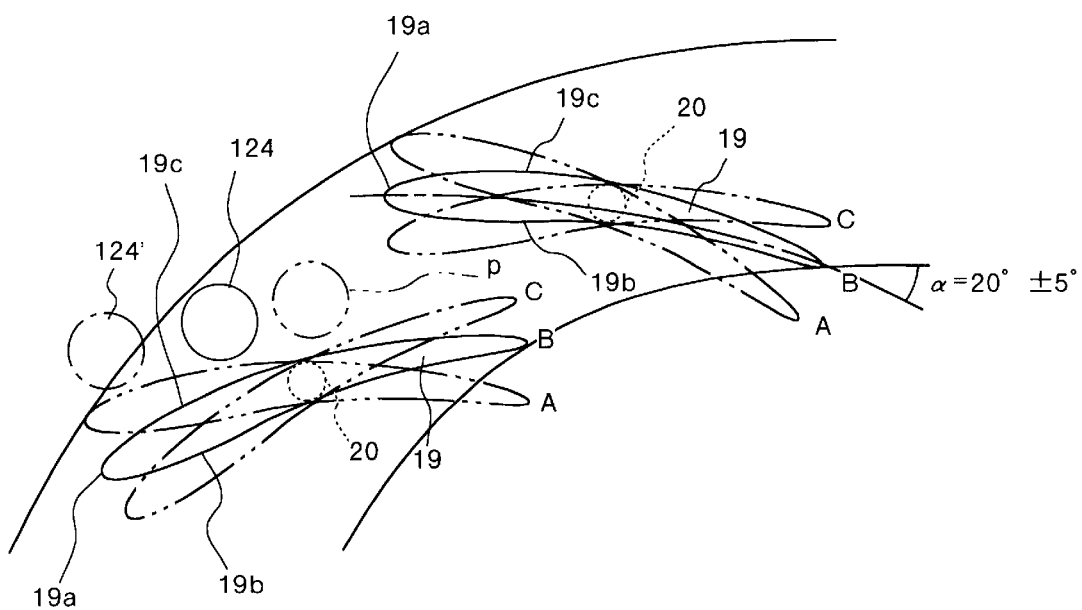
FIG. 9 is an explanatory view which shows an essential portion of another embodiment of the variable displacement turbine of the invention.

FIG. 9 shows an essential portion of another embodiment of the variable displacement turbine of the present invention. In FIG. 9, portions corresponding to those in FIG. 2 are designated with the same symbols as those in FIG. 2, and explanation thereof will be omitted.

In this embodiment, a support pin 124 is provided on the side of the pressure surface 19c of the movable nozzle blade 19. The support pin 124 does not come into contact with the movable nozzle blade 19 when is located in the maximum opening position A, and the support pin 124 is disposed at a position closer to the front edge 19a of the movable nozzle blade 19 than a rotation center position (position of the shaft body 20) of the movable nozzle blade 19.

Figure 10:
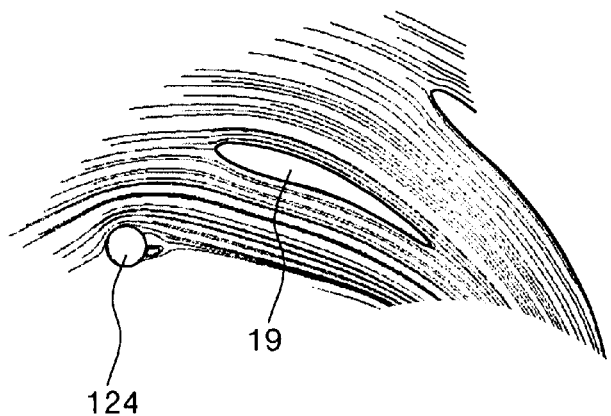
FIGS. 10(a) to (c) show flow lines around the movable nozzle blades and the support pin in the variable displacement turbine of the invention.
Figure 10:
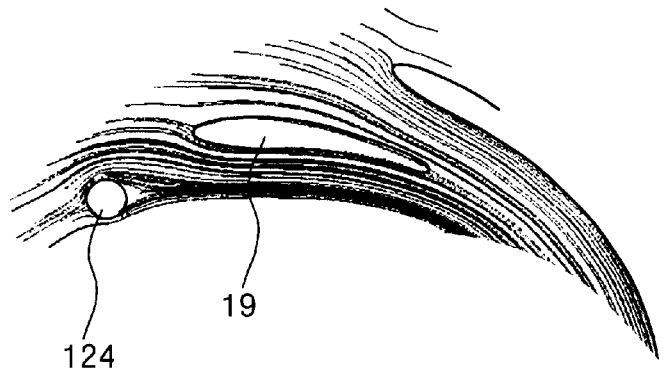
Figure 10:
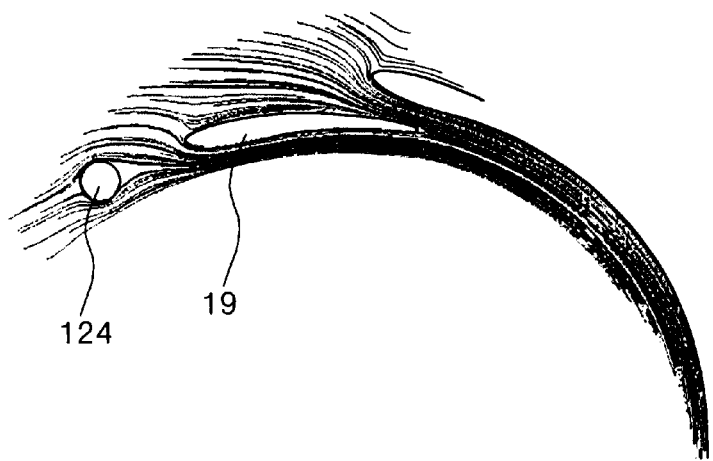
Figure 11:
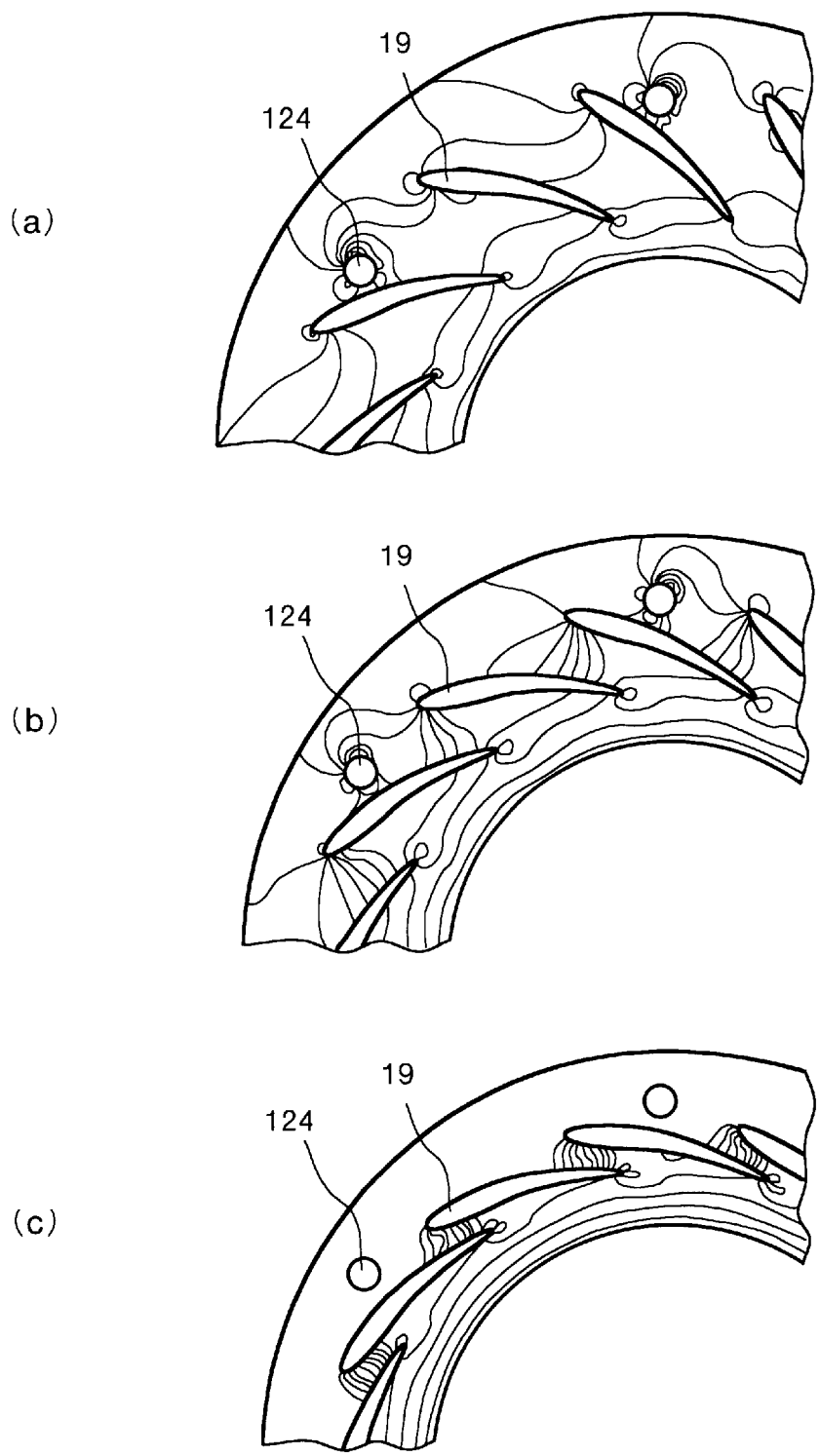
FIGS. 11(a) to (c) show a static pressure distribution around the movable nozzle blades and the support pin in the variable displacement turbine of the invention.
Figure 12:
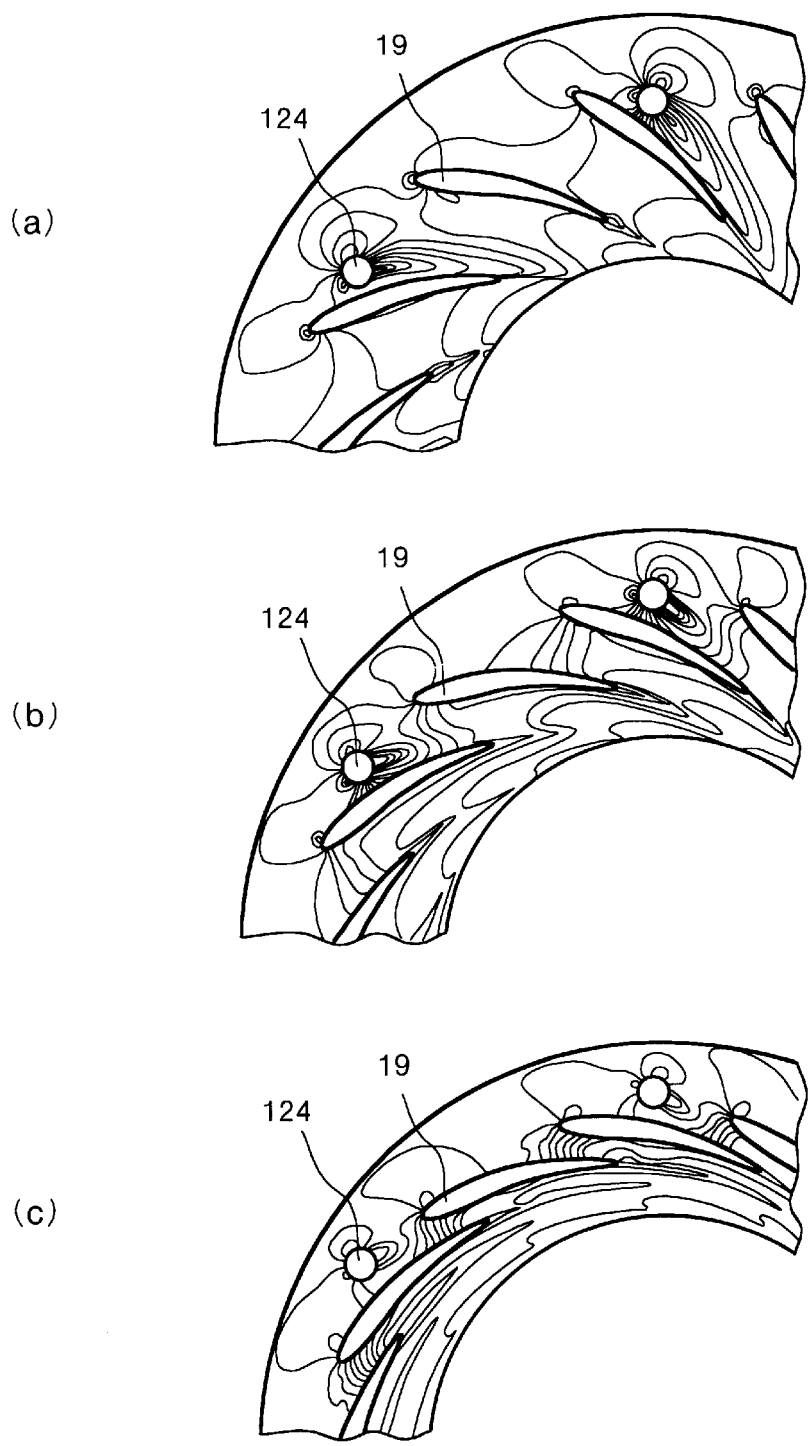
FIGS. 12(a) to (c) show an absolute velocity distribution of flow around the movable nozzle blades and the support pin in the variable displacement turbine of the invention.

FIG. 10 shows flow lines around the movable nozzle blades 19 and the support pin 124 obtained by a result of the flow analysis when the support pin 124 is disposed in the disposition position described above, FIG. 11 shows a static pressure distribution and FIG. 12 shows the absolute velocity distribution. In FIGS. 10 to 12 also, (a) shows a maximum opening position state, (b) shows a rating opening position state and (c) shows a minimum opening position state.

From the above flow analysis result, in the conventional example, the support pin p aerodynamically affects the movable nozzle blade 19 at any nozzle opening as described above, and especially in the minimum opening position, the support pin p closes a passage between the blades, which becomes great flow path resistance. Whereas, with the support pin 124, there is almost no aerodynamic effect at the minimum opening. In the rating opening position to the maximum opening position, although there is a slight effect, a great pressure expansion is not generated in the vicinity of the nozzle blade, and since the nozzle throat area is great, it is conceived that there is no problem. With this, the support pin 124 does not affect the movable nozzle blade 19 aerodynamically especially when the movable nozzle blade 19 is in the low opening position, and efficiency at a small flow rate is enhanced.

An appropriate disposition range of the support pin 124 in this instance is about between a front edge position (corresponding to a position of the support pin designated with a symbol 124') of the movable nozzle blade 19 and a substantially intermediate position (corresponding to a position of the support pin designated with a symbol 124) between a rotation center of the movable nozzle blade 19 and the front edge 19a of the movable nozzle blade.

Figure 13:
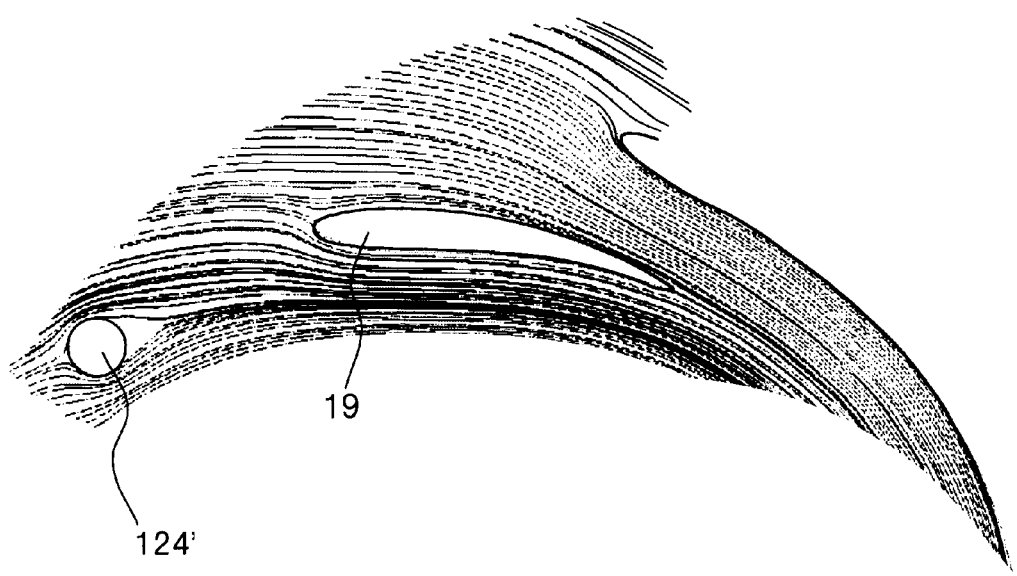
FIG. 13 shows flow lines around the movable nozzle blades and the support pin in the variable displacement turbine of the invention.
Figure 14:
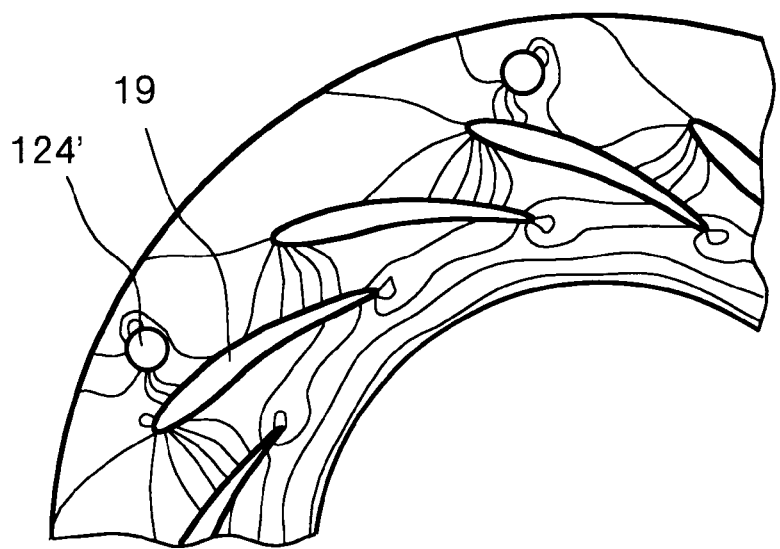
FIG. 14 shows a static pressure distribution around the movable nozzle blades and the support pin in the variable displacement turbine of the invention.
Figure 15:
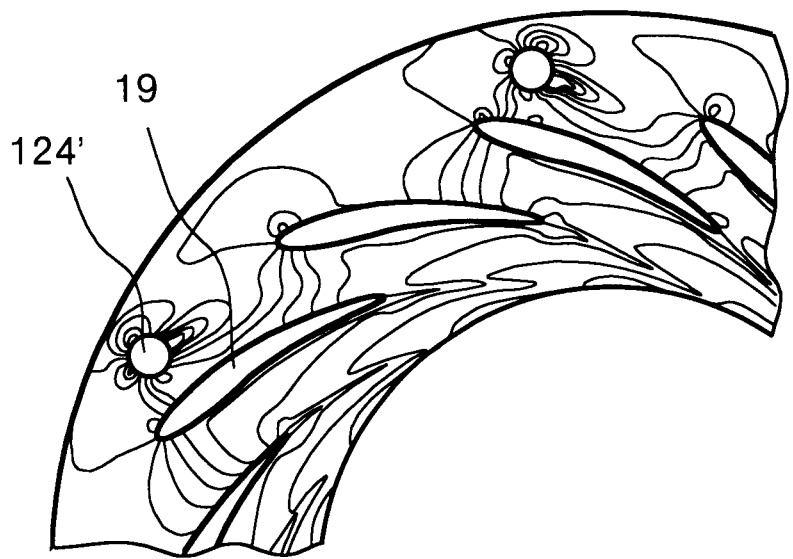
FIG. 15 shows the absolute velocity distribution of flow around the movable nozzle blades and the support pin in the variable displacement turbine of the invention.

FIG. 13 shows flow lines around the movable nozzle blades 19 and the support pin 124' obtained by a result of the flow analysis when the support pin 124' is disposed in the disposition position described above, FIG. 14 shows a static pressure distribution and FIG. 15 shows the absolute velocity distribution. In FIGS. 14 to 15, the rating opening position state is shown as representative.

Also with the support pin 124', there is almost no aerodynamic effect when the movable nozzle blade 19 is in the low opening position, and efficiency at a small flow rate is enhanced.

As explained above, according to the variable displacement turbine of the present invention, since the support pin is disposed at a position in front of the movable nozzle blade front edge in a state in which the movable nozzle blade is located in the rating opening position ($\alpha=20°\pm5°$) which is set between the maximum opening position and the minimum opening position, the aerodynamic effect, especially, the aerodynamic effect in a state of the rating opening position to the minimum opening position, is reduced by the disposition position of the support pin with respect to the movable nozzle blade, and efficiency at a small flow rate is enhanced.

Further, according to the variable displacement turbine of the invention, the support pin does not come into contact with the movable nozzle blade when located at the maximum opening position on the side of the pressure surface of the movable nozzle blade. The support pin is disposed at a position closer to the front edge of the movable nozzle blade than the rotation center position of the movable nozzle blade. Therefore, the aerodynamic effect, especially the aerodynamic effect in a state of the low opening position, is reduced by the disposition position of the support pin with respect to the movable nozzle blade, and efficiency at a small flow rate is enhanced.

The variable displacement turbine of the present invention is suitable for being used for a turbocharger for a vehicle such as an automobile.

What is claimed is:

1. A variable displacement turbine in which a plurality of movable nozzle blades are rotatably provided between opposed two side wall surfaces around an outer periphery of a turbine blade wheel by shaft bodies, respectively, a clearance setting support pin extending across between the two side wall surfaces is provided in order to maintain a distance between the two side wall surfaces at an appropriate value, wherein
    the support pin is disposed on an extension line or in the vicinity of the extension line of a logarithmic spiral which passes a blade thickness central portion of the movable nozzle blade located in a rating opening position ($\alpha=20°\pm5°$) which is set between a maximum opening position and a minimum opening position.

2. The variable displacement turbine according to claim 1, wherein when an outer diameter of the support pin is defined as d, the support pin is disposed in a distance range away from the front edge of the movable nozzle blade through 3d.

3. The variable displacement turbine according to claim 1, wherein the support pin is located on the side of a negative pressure surface of the movable nozzle blade by increasing opening of the movable nozzle blade from the rating opening position ($\alpha=20°\pm5°$), and the support pin is located on the side of a pressure surface of the movable nozzle blade by reducing the opening of the movable nozzle blade from the rating opening position.

4. A variable displacement turbine in which a plurality of movable nozzle blades are rotatably provided between opposed two side wall surfaces around an outer periphery of a turbine blade wheel by shaft bodies, respectively, a clearance setting support pin extending across between the two side wall surfaces is provided in order to maintain a distance between the two side wall surfaces at an appropriate value, wherein
    the support pin is disposed at a position closer to a front edge of the movable nozzle blade than a rotation center position of the movable nozzle blade on the side of a pressure surface of the movable nozzle blade without contacting with the movable nozzle blade located at a maximum opening position.

5. A variable displacement turbine according to claim 4, wherein the support pin is disposed between a front edge position of the movable nozzle blade and a substantially intermediate position between a rotation center of the movable nozzle blade and the front edge of the movable nozzle blade.

6. A variable displacement turbine in which a plurality of movable nozzle blades are rotatably provided between two opposed side wall surfaces around an outer periphery of a turbine blade wheel by respective shaft bodies, a clearance setting support pin extending across between the two side wall surfaces is provided to maintain a distance between the two side wall surfaces at an appropriate value, wherein
    the support pin is disposed on an extension line or in the vicinity of the extension line of a logarithmic spiral which passes a blade thickness central portion of one of the movable nozzle blades located at a rating opening position, $\alpha=20°+/-5°$, which is set between a maximum opening position and a minimum opening position.

7. The variable displacement turbine of claim 6, wherein when an outer diameter of the support pin is defined as d, the support pin is disposed within a distance 3d away from a front edge of one of the movable nozzle blades.

8. The variable displacement turbine of claim 6, wherein the support pin is located on a negative pressure surface side of the one of the movable nozzle blades when the one of the movable nozzle blades is moved from the rating opening position toward the maximum opening position and is located on a pressure surface side of the one of the movable nozzle blades when the one of the movable nozzle blades is moved from the rating opening position toward the minimum opening position.

\* \* \* \* \*